Patented Dec. 7, 1926.

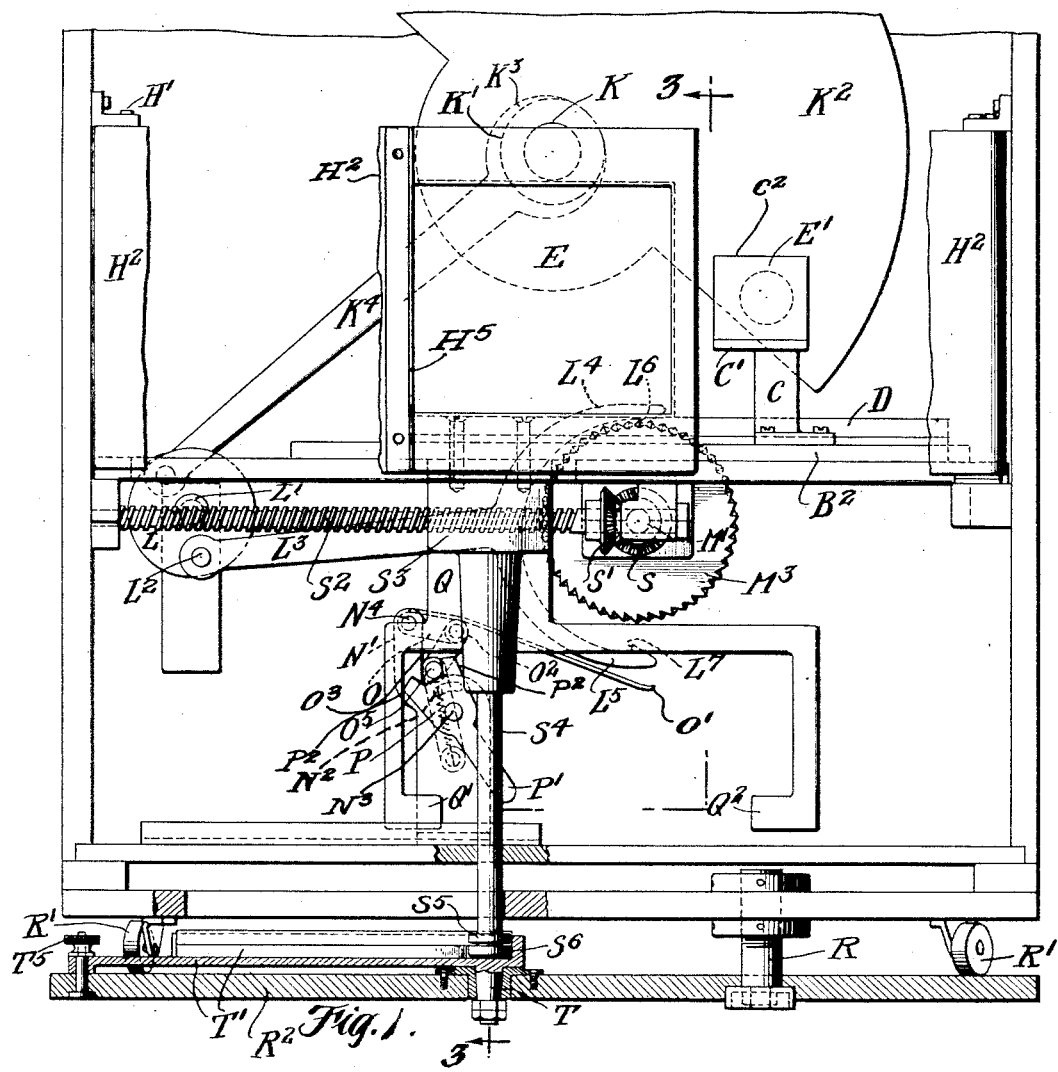

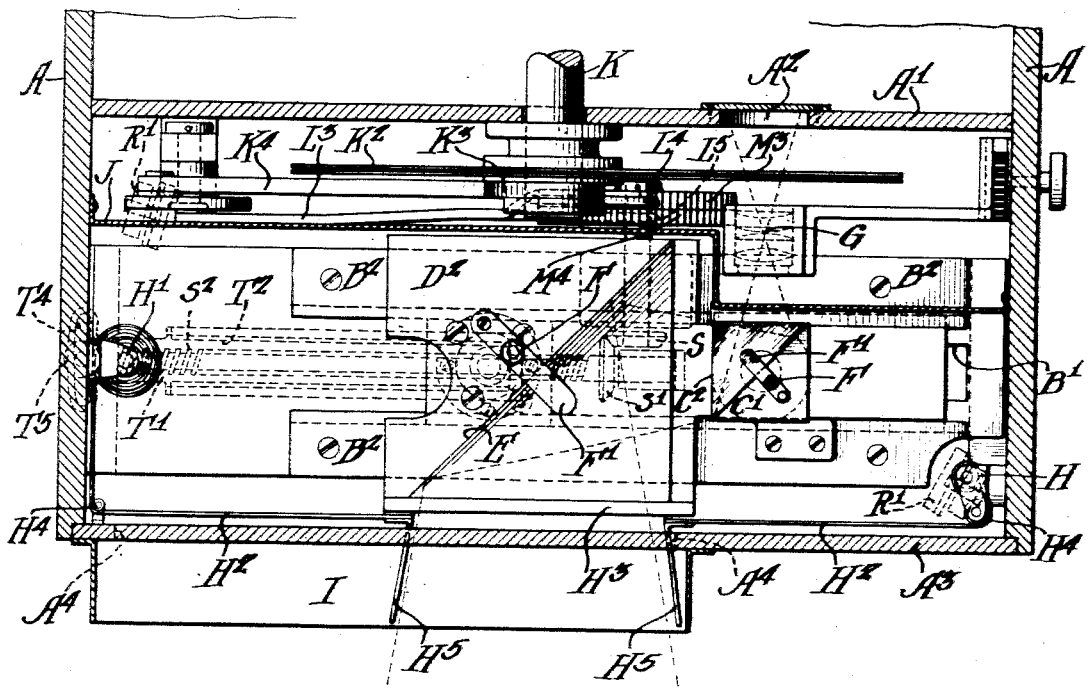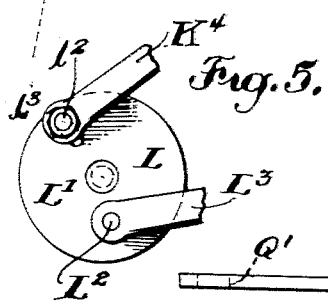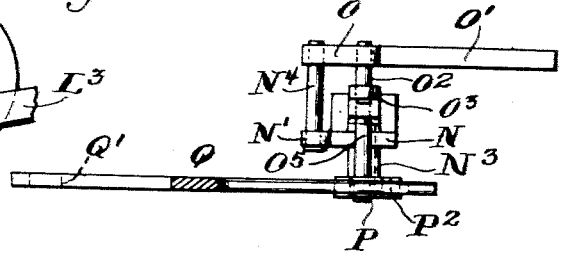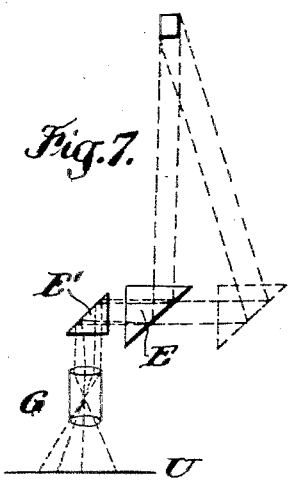

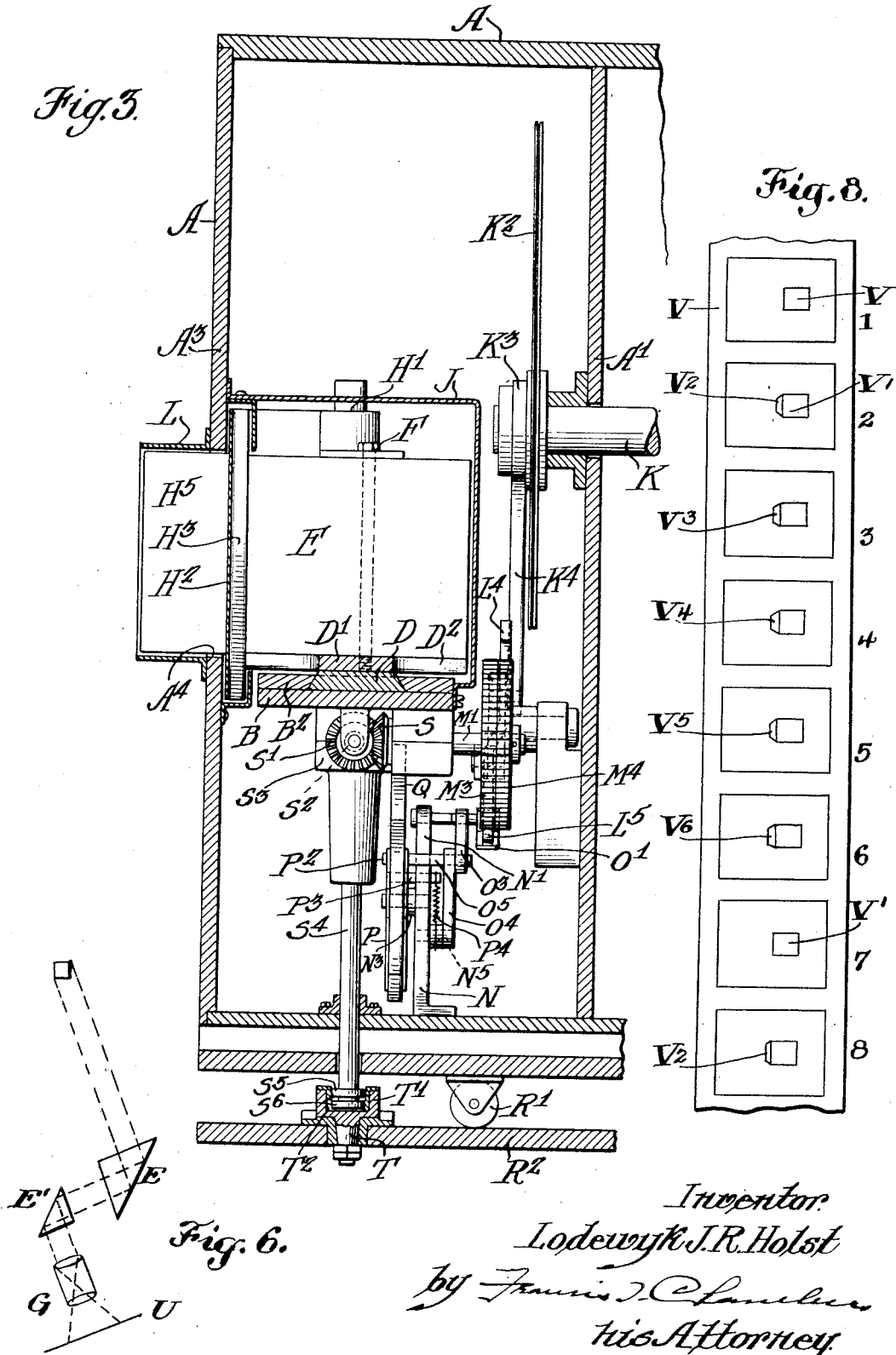

1,609,819

UNITED STATES PATENT OFFICE.

LODEWYK J. R. HOLST, OF PHILADELPHIA, PENNSYLVANIA, ASSIGNOR TO HIMSELF AND CLARENCE WOLF, OF PHILADELPHIA, PENNSYLVANIA.

MOVING-PICTURE CAMERA.

Application filed September 25, 1920. Serial No. 412,840.

The purpose of this invention is to produce negatives on the usual film strips of moving picture cameras, so that prints thereof when projected by a good projector will produce in the mind of the observer a strong and compelling suggestion of stereoscopic depth, without the panoramic swaying of the image from left to right and right to left, which is inherent in all such pictures made by the various means hitherto disclosed.

Since the perception of distance is produced in the mind by the combining of views of the same objects simultaneously observed from two view points, located in the same horizontal plane at a distance apart equal to the distance of the centers of the eyes, views produced from one single viewpoint cannot awaken in the mind the sensation of depth so long as they are viewed with both eyes. Observation of such views through one eye only may however under suitable conditions of perspective result in a strong sensation of depth being created in the mind. Life long experience in viewing all objects with both eyes has trained the mind to recognize as flat all views of which each eye produces exactly the same image.

This condition being the case when observing with two eyes moving picture scenes as projected on the screen, the sensation of depth is not awakened, however favorable the effect of perspective may be, and in order to create the sensation of depth notwithstanding the observation of the same image by each eye, it is necessary to give to the view such exaggerated qualities of perspective that the observer actually sees more of each object depicted than his normal visual experience causes him to expect to see.

This condition can be produced, when making use of the faculty of the retina to retain an image for an appreciable time after actual observation. This makes it possible to produce in what appears to be simultaneous observation, two or more views of the same objects as seen from horizontally shifting view points. The perspective of such views blends in the mind as if it were the perspective created by the objects themselves and not by images thereof, and consequently the sensation of distance and depth is awakened the same as if the observer looked at the objects directly.

The occular observations produce sharp impressions of objects directly in the line of sight, and the sharpness of delineation gradually fades in all directions, up to the limits of the field of view. This fading is so gradual that we fail to observe that the field changes when the center of observation is changed from one point to another. In fact we are not aware that our field of view is limited, since it always centers on the object observed. Pictures have, however, a limited field of view, and the observation of a picture immediately makes the observer aware of these limits. If thus, by shifting of the view point the actual view is changed, the limits change to the same extent from right to left or vice versa, as the view point was changed. Since the change takes place in a horizontal plane, the upper and lower margins are not affected. It is thus plain that the use of any means whatsoever whereby the viewpoints of successive images are changed will automatically cause a certain amount of panoramic shifting of the image. In connection with street and landscape scenes frequently seen in travel pictures, this panoramic effect is by no means objectionable, in fact it is frequently intentional and always awakens the most compelling sensation of depth, enhancing the beauty of such views, but when a similar panoramic effect, even in lesser degree is present when the setting should be at rest, any noticeable trace of panoramic shifting becomes exceedingly objectionable and detracts by its mere presence from the illusion of depth which would be obtained without it.

My present invention overcomes this defect thus far inherent in moving pictures with shifting viewpoints and consists in a moving picture camera especially devised to take pictures free from the above noted defects.

My invention will be best understood as described in connection with the drawings in which—

Figure 1 is a front view of a camera embodying the leading features of my mechanical invention shown with the front of the camera removed and the top cut away.

Figure 2 is a plan view.

Figure 3 is a vertical elevation on line 3—3 of Fig. 1.

Figure 4 is a plan view of the feed shifting device shown in Figs. 1 and 3.

Figure 5 is a detail.

Figure 6 is a diagrammatic view showing a tendency to shift the marginal limits of successive pictures taken with the camera of Figs. 1, 2 and 4.

Figure 7 is a similar diagrammatic view showing how the device shown in Figs. 7, 8 and 9 corrects this defect, and Figure 8 is a diagrammatic view of my improved film.

A is the camera box; A' the front panel having the opening $A^2$ through which the rays from the lens pass to the film, not shown. $A^3$ is the rear panel of the box formed with a horizontal slot $A^4$. B is the horizontal plate extending across the camera box and formed with a longitudinal slot indicated at B' on each side of which are secured slide guides indicated at $B^2$ $B^2$. C is a standard secured to one of the slide guides and supporting platform C' on which is secured the reflector $C^2$ which is preferably a prism shown as clamped on the platform C' by a clamping device indicated at F, F'. D is a slide secured between the slide guides $D^2$ $D^2$ and having secured to its upper surface the plate D' broadened out at the left hand side as indicated at $D^2$ to form a platform for supporting the movable prism E clamped upon the portion $D^2$ by the fastening device indicated at F and F'. $F^3$ is a rack secured to the bottom of the slide D. G is the lens of the camera secured in position to receive the light rays reflected from the stationary prism E'. H and H' are spring rolls between which extends the flexible screen indicated at $H^2$, $H^2$ secured to the side edges of the rectangular frame $H^3$ and running over guide rolls indicated at $H^4$, $H^4$. $H^5$, $H^5$, indicate plates extending from the sides of the frame $H^3$ through the slot $A^4$. I indicates a flange extending outward from the edges. J is a casing enclosing the part of the camera containing the reflecting prisms, as shown. K is the ordinary shutter actuating shaft driven by mechanism of the usual kind, not shown. K' is an eccentric secured to the shaft K; $K^2$ a shutter also secured to this shaft; $K^3$ an eccentric ring working on the eccentric K' and having the lever arm $K^4$ extending from it which is attached to the pin $l^2$ adjustably secured in the crank disc L, pivoted at L', having also secured to it the crank pins $L^2$ to which is secured the rod $L^3$ having forked ends as indicated at $L^4$ and $L^5$ having at their ends the teeth indicated at $L^6$ and $L^7$ for engaging the ratchet wheels to be described. M is a bearing secured as shown to the plate B and supporting the shaft M' to which is secured the gear wheel S in engagement with the gear S' and to the end of which are secured the ratchet wheels $M^3$ and $M^4$ lying respectively on the same vertical planes with the teeth $L^6$ and $L^7$ of the forked rod $L^3$. N is a standard formed with an upwardly extending arm N' and a segmental slot $N^2$ concentric with the pivot pin $N^3$. $N^4$ is a pin supported in the top of the arm N' and to which is pivoted the spring arm O' which extends out beneath the forked arm $L^5$ of the rod $L^3$. O is a lever pivoted on pin $N^4$ and having pivotally attached to its other end the link $O^3$ pivoted to and forming part of a toggle joint with another link $O^4$ pivotally attached to a pin $N^5$ extending out from the standard N. $O^5$ is the pivot pin of the toggle which extends over the top of the main portion of the standard and lies between the outwardly extending jaws $P^2$ of a lever P pivoted at $N^3$ and having a downwardly extending arm indicated at P'. A pin $P^3$ extends from the lever P through the slot $N^2$ and has attached to it the spring indicated at $P^4$. Q is an arm extending downward from the slide D formed as indicated and carrying the stops Q', $Q^2$, which at the ends of the movement of the slide come in contact with and actuate the arm P' of the lever P.

The camera box is supported on a platform $R^2$ by means of wheels or rollers indicated at R', R', etc. and is pivoted on said platform by a pivot R which for the best results and construction should coincide with the hypotenuse of the reflector prism E'. A gear wheel S is secured on the end of the shaft M' and engages with a mitre wheel S' on the end of a threaded shaft $S^2$ and a nut $S^3$ is threaded on this shaft and secured to the bottom of the slide D and from the bottom of this nut extends a rod $S^4$ having rolls $S^5$, $S^6$, on its lower end which extend into and engage the sides of a slotted lever T' pivoted to the base plate $R^2$ at T. $T^2$ indicates the walls of the slot in the lever T'. $T^4$ a slotted segment at the end of the lever and $T^5$ a binding screw for holding the lever in any angular position to which it can be adjusted. U, Figs. 6 and 7, indicates the film on which the pictures are being taken. V, Fig. 8, is a diagrammatic view illustrating my new film; the consecutive pictures printed on the film are indicated at 1 to 8. At V' I have indicated an object common to each picture and at $V^2$, $V^3$, $V^4$, $V^5$ and $V^6$ I have indicated in an exaggerated way the effect of the changing view points from which the pictures are taken, the view points changing in one direction from 1 to 4 and in the other direction from 4 to 7.

In operation power is applied in the usual way to rotate the shaft K and the shutter $K^2$. The rotation of the eccentric K' on the shaft K gives a reciprocating movement to the eccentric rod $K^4$ which in operation oscillates the crank disk F and through it gives a reciprocating motion to the forked rod $L^3$ which in the condition and operation shown in Fig. 1 is not supported by the spring O' so that the tooth $L^6$ on its arm $L^4$ rests against the toothed edge of the ratchet wheel M⁴ so as to rotate this wheel in an anticlockwise direction and through it to rotate the shaft M' and the gear wheel S which being in engagement with gear S' on the threaded shaft S² feeds the slide by a series of intermittent actions toward the left and shifts the movable prism E also toward the left through a succession of view points which are, of course, directed from the prism E to the prism E' and through it to the lens G and the film. As the prism approaches its extreme left hand position the stop Q² carried by the depending arm Q comes in contact with the arm P' of the lever P pivoted at N³ and moves the forked end in a clockwise direction so that one of its forks or fingers P² comes in contact with the pin O⁵ pushing it toward the right and causing the toggle made up of the articulated levers O³ and O⁴ to straighten out with the result that the spring O' is moved upward causing the forked lever L³ to also move upward until the tooth L⁷ on its arm L⁵ comes in contact with the ratchet wheel M⁸ so that the motion imparted to the forked lever L³ transmits a clockwise motion to this ratchet wheel and to the shaft M' with the result that the prism E has its direction of movement reversed and as it reaches the right hand limit of its movement the stop finger Q' comes in contact with the lever arm P' and restores the toggle to the position shown in Fig. 1.

It will be obvious, of course, that the screen curtain H² will move with the prism and the frame H³ cutting off the admission of light through any part of the slot A⁴ except that occupied by the frame of the prism.

It will be understood, of course, that the lens is covered by the shutter during the period when the prism E is in motion and uncovered for the necessary period during the stationary position of the prism so that the result is that each consecutive picture of the scene is taken from a different view point and the scene is pictured from a multiple series of view points all lying in the same horizontal plane and in which the view point changes progressively in one direction through a series of pictures, then progressively in the opposite direction through another series of pictures so that the pictures are formed as shown in Fig. 8 and a good stereoscopic effect is produced without flickering or other such abnormal changes between the views as to produce an unpleasant and unreal effect upon the eye.

Fig. 6 illustrates diagrammatically that the shifting of the movable prism, when not accompanied by adequate rotative movement of the camera as a whole, shifts image points from one side of the film to the other side, and Fig. 7 illustrates that the adequate amount of rotation of the entire camera keeps the image in the same location on the film notwithstanding the fact that the view is obtained from a sideward shifting point of view. The required amount of rotation is variable with the increasing or decreasing distance of the camera to the view, and the correct adjustment of the rotation required in each case is effected by observing the right and left hand limits of the picture when the movable prism is at the point of its nearest approach to the lens, then moving said prism to its opposite limit of movement whereupon the guide T is displaced as much as will be found necessary to restore to the image the same side limits as were observed in the first instance. The guide T is clamped tight in this position by means of the clamp screw T⁵ and when so adjusted the subsequent operation of the camera will yield film pictures of stereoscopic quality and of stationary marginal limits.

Having now described my invention, what I claim as new and desire to secure by Letters Patent, is:

A moving picture camera pivotally supported on a base plate and having two reflectors whereby a view is reflected into the lens, one of said reflectors being movable in a horizontal plane so as to change the point of view, in combination with means for shifting said movable reflector through a multiple series of points of rest, correlated means for turning the camera on its pivotal support so as to maintain substantially the same angle of incidence between the moving reflector and the view, and a shutter, operatively connected to the means aforesaid, for cutting off the light rays from the film during the periods when the movable reflector is in motion.

LODEWYK J. R. HOLST.